United States Patent
Fonzi et al.

(10) Patent No.: US 9,984,394 B2
(45) Date of Patent: *May 29, 2018

(54) SENSOR DATA GATHERING

(71) Applicant: salesforce.com, inc., San Francisco, CA (US)

(72) Inventors: Bruno Fonzi, San Mateo, CA (US); Amy Catherine Lee, San Mateo, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/669,663

(22) Filed: Aug. 4, 2017

(65) Prior Publication Data

US 2017/0330240 A1    Nov. 16, 2017

Related U.S. Application Data

(63) Continuation of application No. 15/283,160, filed on Sep. 30, 2016, now Pat. No. 9,727,897, which is a
(Continued)

(51) Int. Cl.
*H04B 5/00* (2006.01)
*G06Q 30/02* (2012.01)
(Continued)

(52) U.S. Cl.
CPC ....... *G06Q 30/0269* (2013.01); *G06Q 30/016* (2013.01); *G06Q 30/0281* (2013.01); *H04W 4/008* (2013.01); *H04W 4/02* (2013.01)

(58) Field of Classification Search
None
See application file for complete search history.

(56) References Cited

U.S. PATENT DOCUMENTS 5,577,188 A   11/1996   Zhu
5,608,872 A   3/1997   Schwartz et al.
(Continued)

OTHER PUBLICATIONS

U.S. Appl. No. 15/283,160—Office Action dated Dec. 15, 2016, 9 pages.
(Continued)

*Primary Examiner* — Tuan A Tran
(74) *Attorney, Agent, or Firm* — Sterne, Kessler, Goldstein & Fox P.L.L.C.

(57) ABSTRACT

A sensor data gathering environment that associates a sensor with a smart tag attached to a product. The sensor receives product identification data from the smart tag. An application, web service or a computing device associated with the sensor collects customer behavior data, such as a length of time the sensor is associated with the smart tag, the proximity of the sensor to the smart tag, the location of the sensor while in a threshold distance from the smart tag, and the like. The application, web service or the computing device associated with the sensor transmits the product identification data and the customer behavior data to a remote computing system for analysis. Based on the analysis, a message or communication is initiated to provide the customer with personalized customer service.

26 Claims, 5 Drawing Sheets

Sensor Data Gathering Environment

Related U.S. Application Data continuation of application No. 14/839,515, filed on Aug. 28, 2015, now Pat. No. 9,460,442.

(60) Provisional application No. 62/052,887, filed on Sep. 19, 2014.

(51) Int. Cl.
  *G06Q 30/00* (2012.01)
  *H04W 4/00* (2018.01)
  *H04W 4/02* (2018.01)

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,154,139 A * | 11/2000 | Heller ............ G08B 3/1083 340/572.1 |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,400,272 B1 * | 6/2002 | Holtzman ............ G06K 7/0008 340/572.1 |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,965,317 B2 * | 11/2005 | Fujimoto ............ G08B 13/2417 340/573.1 |
| 7,062,502 B1 | 6/2006 | Kesler |
| 7,069,231 B1 | 6/2006 | Cinarkaya et al. |
| 7,069,497 B1 | 6/2006 | Desai |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,437,300 B2 * | 10/2008 | Fujimoto ............ G06Q 10/02 340/4.62 |
| 7,508,789 B2 | 3/2009 | Chan |
| 7,603,483 B2 | 10/2009 | Psounis et al. |
| 7,620,655 B2 | 11/2009 | Larsson et al. |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,756,275 B2 | 6/2014 | Jakobson |
| 8,769,004 B2 | 7/2014 | Jakobson |
| 8,769,017 B2 | 7/2014 | Jakobson |
| 8,781,622 B2 * | 7/2014 | Mockus ............ G06Q 20/18 700/232 |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2002/0183979 A1 * | 12/2002 | Wildman ............ G06F 19/327 702/188 |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |

(56) References Cited

U.S. PATENT DOCUMENTS

| | | |
|---|---|---|
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0246359 A1* | 11/2005 | Robbins ............... B42D 15/006 |
| 2006/0021019 A1 | 1/2006 | Hinton et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0150251 A1* | 6/2009 | Zhitomirsky ...... G06Q 30/0601 705/26.1 |
| 2009/0177744 A1 | 7/2009 | Marlow et al. |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0247216 A1 | 9/2013 | Cinarkaya et al. |
| 2015/0278829 A1* | 10/2015 | Lu ........................ H04W 64/00 705/7.29 |
| 2015/0278888 A1* | 10/2015 | Lu ...................... G06Q 30/0267 705/14.64 |
| 2015/0341225 A1* | 11/2015 | Baarman ............... H04L 41/145 705/333 |

OTHER PUBLICATIONS

U.S. Appl. No. 14/839,515—Ex Parte Quayle Action dated Apr. 11, 2016.
U.S. Appl. No. 15/283,160—Response to Office Action dated Dec. 15, 2016 filed Mar. 15, 2017, 2 pages.
U.S. Appl. No. 15/283,160—Notice of Allowance dated Apr. 10, 2017, 5 pages.
U.S. Appl. No. 14/839,515—Notice of Allowance dated Jun. 3, 2016, 5 pages.
U.S. Appl. No. 14/839,515—Response to Ex Parte Quayle Action dated Apr. 11, 2016 filed May 25 2016, 9 pages.

* cited by examiner

FIG. 1 Sensor Data Gathering Environment

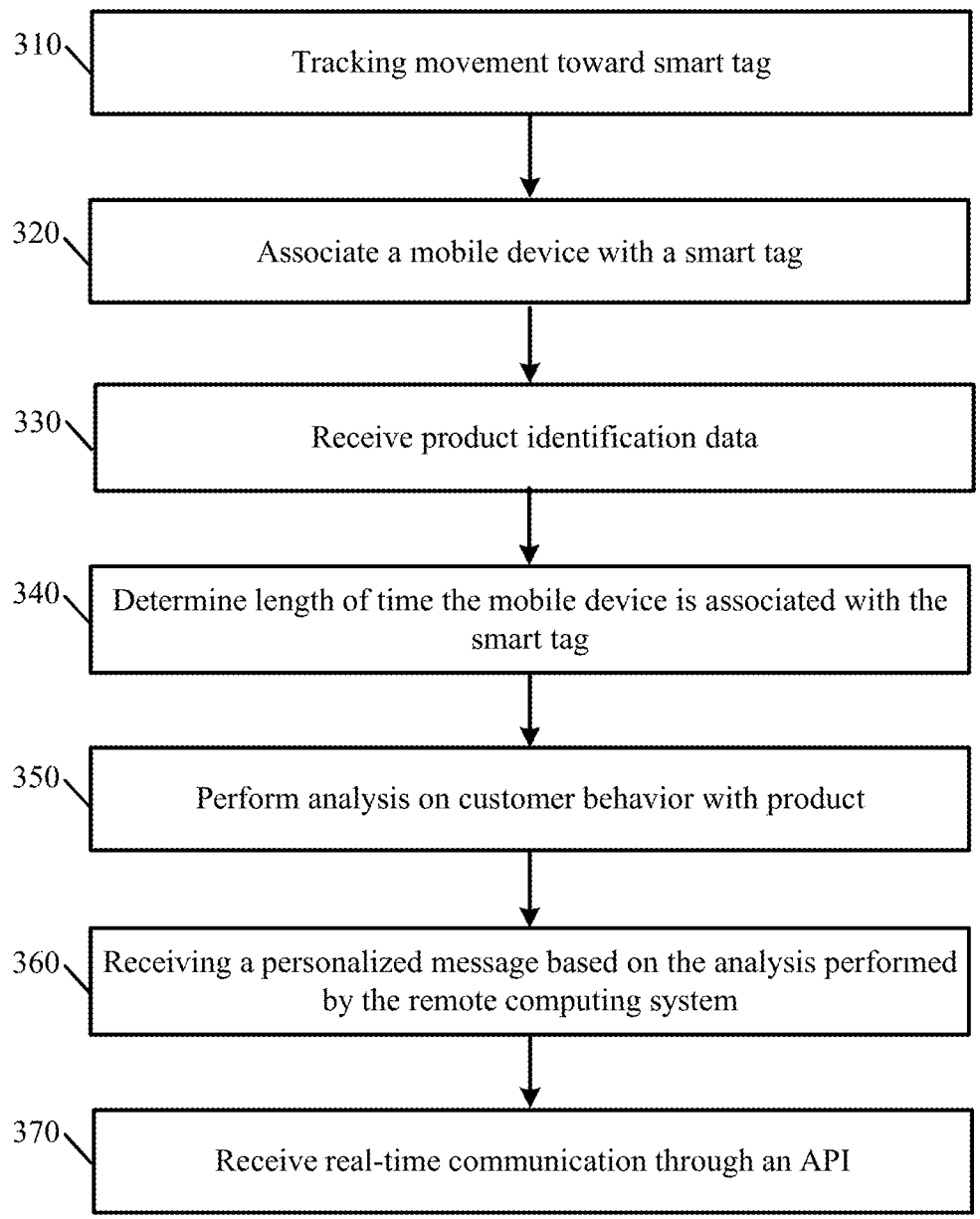
FIG. 3 Associate a Sensor with a Smart Tag

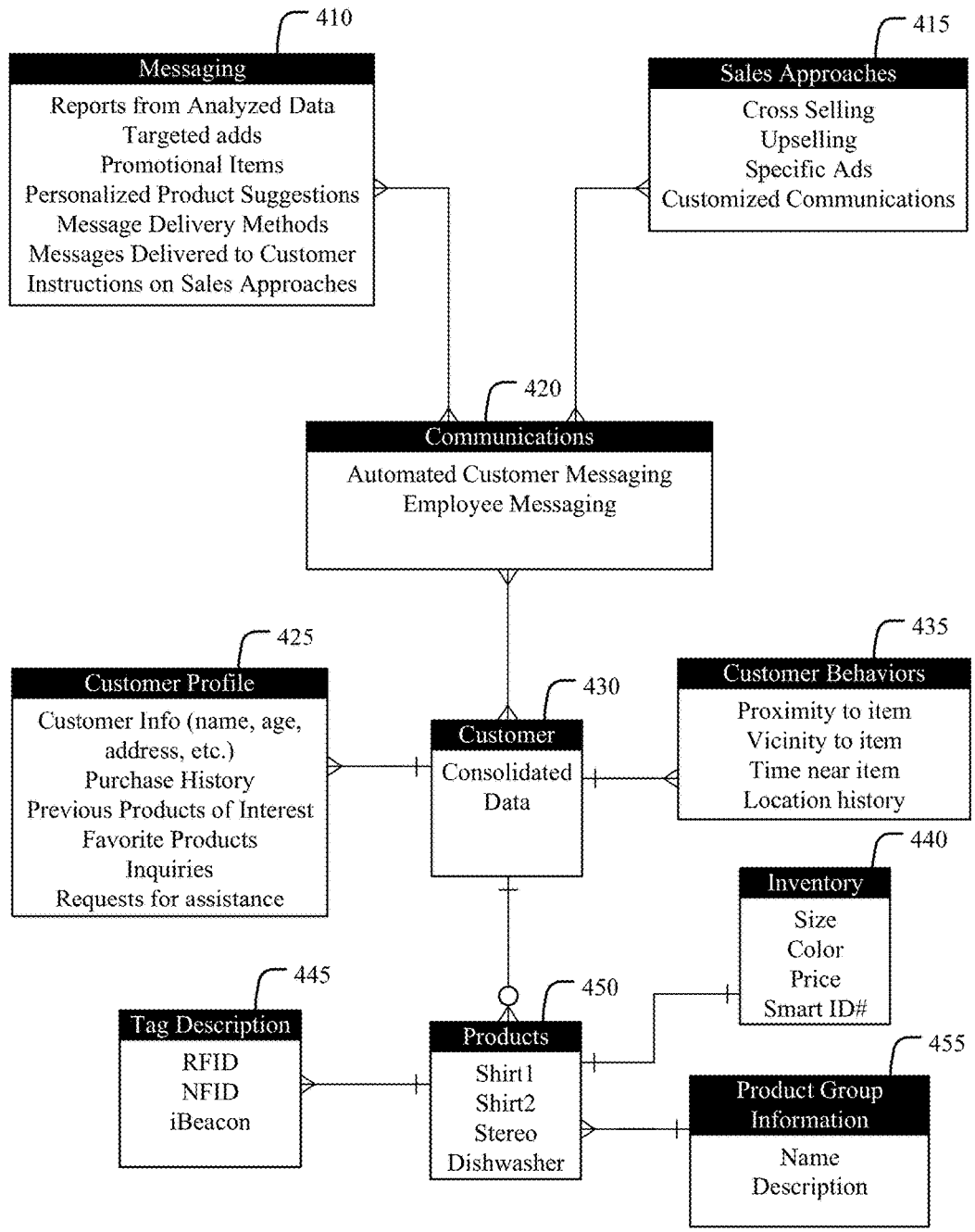
FIG. 4 Data Structures

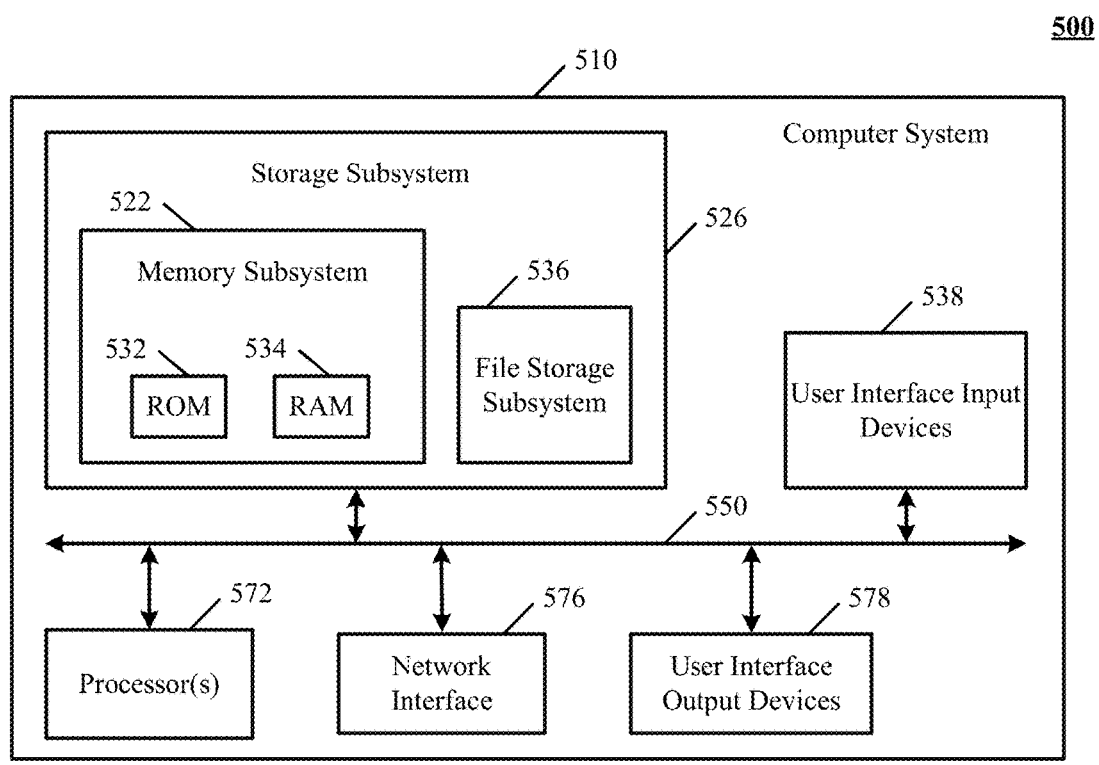
FIG. 5 Computer System

SENSOR DATA GATHERING

RELATED APPLICATION

This application is a continuation of U.S. patent application Ser. No. 15/283,160, filed Sep. 30, 2016, entitled "SENSOR DATA GATHERING", which is a continuation of U.S. patent application Ser. No. 14/839,515, filed Aug. 28, 2015 entitled "SENSOR DATA GATHERING", which claims the benefit of U.S. Provisional Patent Application No. 62/052,887 filed on Sep. 19, 2014 entitled "SENSOR DATA GATHERING". This provisional patent application is incorporated by reference as if fully set forth herein.

TECHNICAL FIELD

This disclosure relates generally to the use of smart tags on products to provide personalized customer service.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art.

Customer satisfaction and retention can be strongly related to a company's ability to provide a personalized shopping experience. E-commerce has changed the retail industry by offering better customer service than their brick and mortar counterparts. The success of e-commerce can be attributed to the personalization of the shopping web service creating a customized shopping experience. This personalization often goes far beyond a customer's current expectations, creating customer loyalty.

E-commerce websites often provide targeted advertisement and personalized product suggestions based on the customer's purchase history, favorite products, and so forth. Brick and mortar stores do not have this capability and traditionally advertise products in a non-interactive manner. For example, retailers will often place product marketing messages displayed through the mass media or in store aisles. Hence, the target marketing segments are neither very specific nor personalized.

To compete with the growing trend of online shopping, brick and mortar stores must refocus their customer service practice by adding technologies to create a totally new shopping experience. To that end, many retailers have begun to use smart ID tags to provide a better shopping experience for their customers. For example, retailers use smart ID tags on products, such as clothing, to better ensure shelves remain stocked with products of different sizes and colors and provide a concise inventory list of products stored in the backrooms to employees that are assisting customers. However, this measure alone has not provided the customers with personalized customer service needed to compete with many of the online retailers.

An opportunity arises for a system to automatically provide in-store customers with a more personalized in-store shopping experience. For example, for customers that are wandering along store aisles and selecting products, interactive and powerful cross-selling and upselling promotions could be presented to the customers to influence their buying decisions and maximize the customers' total purchase value.

SUMMARY

The technology disclosed relates to connecting a customer to a specific product by identifying the customer's interaction with that product. Combinations of technologies are used to identify the location of the customer and to know when the customer has manipulated a product. These technologies also assist with the purchase transaction.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that can be made by one skilled in the art without departing from the spirit and scope of this disclosure. A more complete understanding of the subject matter can be derived by referring to the detailed description and claims when considered in conjunction with the following figures, wherein like reference numbers refer to similar elements throughout the figures.

FIG. 3 is a flow chart of one implementation of associating a mobile computing device with a smart tag.

FIG. 4 is one implementation of a data structure that can support sensor based data gathering and processing.

FIG. 5 is a block diagram for an example computer system.

DETAILED DESCRIPTION

The following detailed description is made with reference to the technology disclosed. Implementations are described to illustrate the technology disclosed, not to limit its scope, which is defined by the claims. Those of ordinary skill in the art will recognize a variety of equivalent variations on the description.

Personalized customer service can be accomplished through the analysis of a customer's behavior within a store, and in particular, with the customer's interaction with products of interest. For example, the following behavior can indicate a customer's interest in a product but a hesitation to purchase the product: a customer picks up a product, walks around with it for 45 seconds, puts it down, leaves the store, returns to the store, and picks the product up again. A retailer, utilizing this information, may be able to persuade the customer to purchase the product by providing promotional information, specific advertisements, or customized communication via a device carried by the customer.

Figure 1:
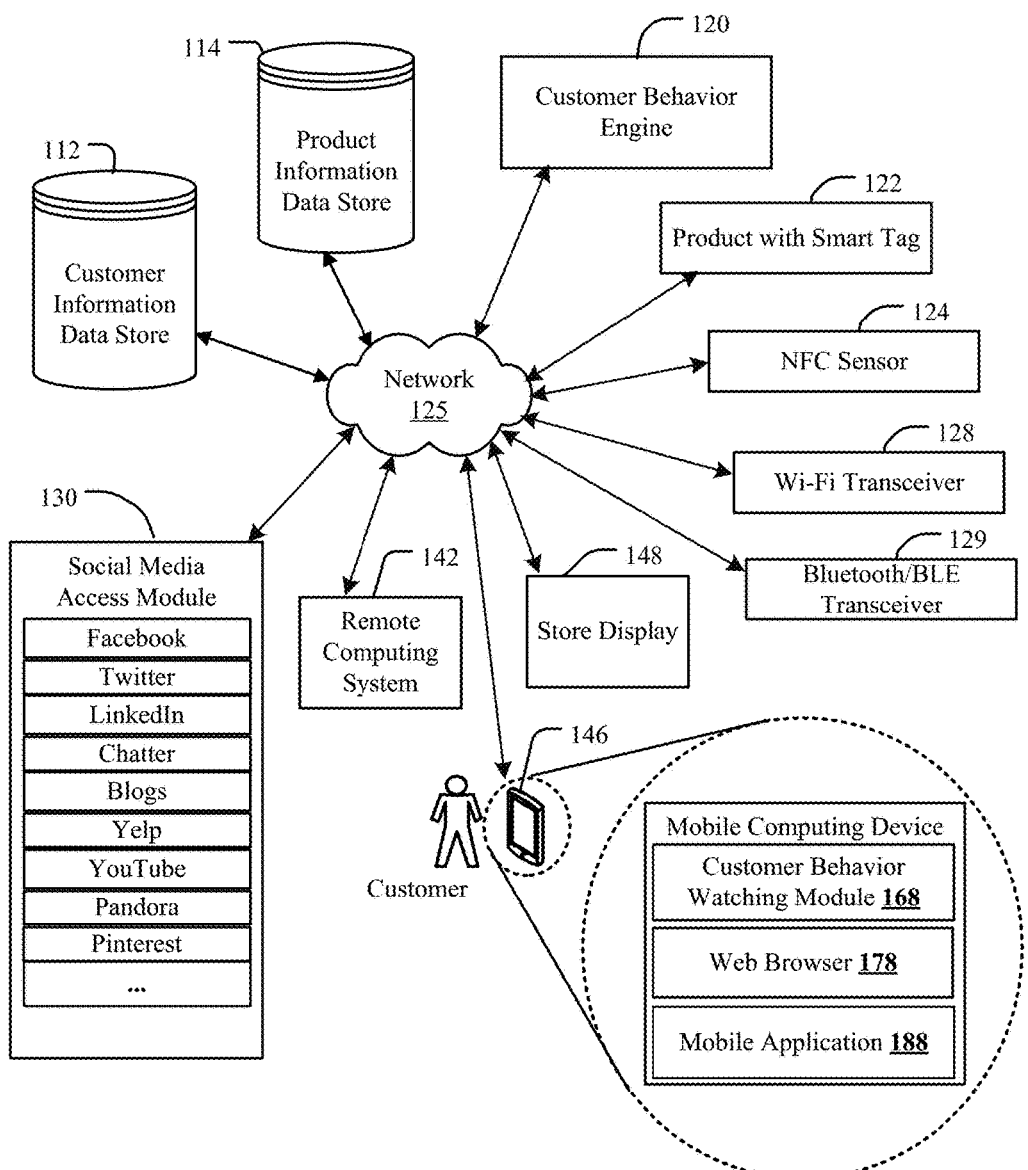
FIG. 1 illustrates one implementation of a sensor data gathering environment.

FIG. 1 illustrates one implementation of a sensor data gathering environment 100. FIG. 1 shows that environment 100 can include a customer information data store 112, a product information data store 114, and a network 125 that allows communication among the various components in the environment 100. Sensor data gathering environment 100 further includes a social media access module 130, a customer behavior engine 120, an exemplary product with a smart tag 122, a Near Field Communication (NFC) sensor 124, a Wi-Fi transceiver 128, a Bluetooth transceiver 129, an electronic store display 148, a remote computing system 142, and a mobile computing device 146. The systems that support the modules of sensor data gathering environment 100 can be of varying types including cell phones, workstations, servers, computing clusters, blade servers, server farms, or any other data processing systems or computing devices. In other implementations, environment 100 may not have the same elements as those listed above and/or may have other/different elements instead of, or in addition to, those listed above.

The customer information data store 112 can include a customer's biographical and behavioral data comprising the user's identity. Biographical information can include name, address, date of birth, education, past employment, purchase history, previous products of interest, favorite products, inquiries, and requests for assistance. Behavioral data can include browsing history or normalized data extracted from browsing history, and social media interactions such as recent business contacts, affiliations, mentions, subscriptions, and other data that indicates or suggests which products are of interest to the customer. A customer is considered to be someone contemplating the purchase of an item, or who has purchased an item in the past. The customer information data store 112 can include structured and unstructured data. In some implementations, a customer information data store 112 can include URLs and web page content such as blog posts, as well as browsing history for videos, music, and business contacts. Data in the customer information data store 112 can, for example, include a list of what products have been searched for via a customer's browser using tools such as Zendesk, Zoho and ExactTarget Marketing Cloud. Trust features of the technology can be implemented to preserve the customer's confidence that personal data is being used appropriately and for limited purposes, preferably with the customer's knowledge and consent. Other implementations could require the customer to take an action to opt-out of giving permission to use their behavior data. Sometimes, behavior watching has been implemented without notice or with notice that customers are likely to miss, which is not the preferred approach.

Social media access module 130 can include, but is not limited to access to Facebook, Twitter, LinkedIn, Chatter, Yelp, YouTube, Pandora, Pinterest, etc. Modules can be communicatively coupled to the customer information data store 112 via different network connections. For example, a Facebook module can be connected through the internet, while a blog can be coupled to a direct network link. In one example, a social media access module 130 can be connected to a sensor data gathering environment 100 via a Wi-Fi hotspot.

In one implementation, data stores can store information from one or more tenants into tables of a common database image to form an on-demand database service (ODDS), which can be implemented in many ways, such as a multi-tenant database system (MTDS). A database image can include one or more database objects. In other implementations, the databases can be relational database management systems (RDBMSs), object oriented database management systems (OODBMSs), distributed file systems (DFS), no-schema database, or any other data storing systems or computing devices. A tenant can be a manufacturer or supplier of a product 122 within the sensor data gathering environment.

Customer behavior engine 120 can provide data to customer information data store 112 about the interests and actions of customers who opt in, their permission for the use of browsing information from commercial websites, and their permission to track the customer's behaviors in a store. The customer behavior engine 120 can also store the history of a customer's position throughout a store as identified by the interactions between the various stationary sensors throughout the store and the mobile computing device 146, and can act as the correlation processor for tracking technologies. The customer behavior engine 120 can monitor browser cookies, and supercookies that include X-UIDH (Verizon's Unique Identifier Header) headers. This data can additionally include customer interest information gleaned from a customer's social media use. The customer behavior engine 120 can exist on a number of different platforms including a dedicated computer, a cloud computer, a remote computing system 142, or on a mobile computing device 146.

The product information data store 114 can include information about each product in the store such as size, color, price, and the smart ID# of a smart tag associated with the product. It can also include information such as a product name and description, and the location of the product within the store. This information can also be used by the customer behavior engine 120 for analyzing customer behaviors.

In one implementation, a mobile computing device 146 can be connected via the network 125. Network(s) 125 can be any one or any combination of Local Area Network (LAN), Wide Area Network (WAN), Wi-Fi, WiMAX, telephone network, point-to-point network, star network, token ring network, hub network, peer-to-peer connections such as Bluetooth, Near Field Communication (NFC), Z-Wave, ZigBee, or other appropriate configuration of data networks, including the Internet.

In this example, each customer carries a mobile computing device 146 that also acts as a smart tag scanner. Smart tags are small wireless devices, powered or unpowered, using technologies such as RFID (including NFID and NFC), Bluetooth (including BLE), and infrared. RFID is used to uniquely identify an RFID tag using radio waves, and NFC is a specialized subset within the family of RFID technology. Both technologies operate at the 13.56 MHz frequency. Generally, RFID tags have a read range of 20-to-30 feet, although some RFID tags can be read at 600 feet. NFC has a read range of 10 cm or less. NFC is designed to be a secure form of data exchange, and an NFC device is capable of being both an NFC reader and an NFC tag. Bluetooth tags such as the Tile or the Pixie can transmit between 50 and 150 feet, depending on obstructions. Each smart tag can have a unique identifier written to it that can be returned to a requesting device. A smart tag can be attached to, or otherwise associated with a product, thereby creating a product with smart tag 122. In one example, a combination smart tag, using technologies such as NFC and Bluetooth, can be associated with a product 122, so that both technologies can be used to identify the product. These smart tags are considered to be mobile smart tags.

The mobile computing device 146 can include an identifier such as a supercookie, which can be used to identify the customer and to link the customer's behavior toward items in the store over time. Mobile computing device 146 can include a web browser 178, a mobile application 188, and a customer behavior watching module 168 that provides data about the interests of customers who opt in, the opt in giving permission for the use of information such as their browsing information from commercial websites. The customer behavior watching module 168 can collect data from objects such as browser cookies to access customer information of interest. Mobile computing device 146 can be a personal computer, laptop computer, tablet computer, smartphone, personal digital assistant (PDA), digital image capture device, and the like, with smart tag reading capabilities.

For example, a customer can use their mobile computing device 146 comprising a portable sensor to read a smart tag 122 assigned to a product. The customer's mobile device can also be used to collect and submit customer behavior data related to the customer's interaction with that particular product. The product information and customer behavior data obtained from the mobile computing device's 146 association with the smart tag can be stored on a storage device connected to the mobile computing device 146 and/or transmitted to a remote computing system 142 for storage and analysis via an application or web service. In an exemplary implementation, the mobile computing device 146 reads the smart tag assigned to a product 122 to retrieve at least part of the product information stored in the smart tag.

A remote computing system 142 can be used to process the information collected from devices such as an NFC sensor 124, a Wi-Fi transceiver 128, a Bluetooth transceiver 129, and a mobile device 146. A remote computing system 142 can also host engines such as the customer behavior engine 120 and various data stores. An NFC sensor 124, a Wi-Fi transceiver 128, and a Bluetooth transceiver 129 not included in the mobile computing device 146 are considered stationary sensors, and can communicate with the remote computing system 142 either over a wire or wirelessly. An electronic store display 148 can be used as an output device for communications for automated customer messaging from the remote computing system 142 or other messaging system incorporated within the sensor data gathering environment 100. Take, for example, a customer with a mobile computing device 146, who has recently purchased a brown belt. The Wi-Fi transceivers 128 and Bluetooth transceivers 129 can identify the location of the mobile computing device 146 as being in the proximity of shoes for sale. The remote computing system 142 queries the customer information data store 112, and finds that the customer has purchased the brown belt. A message can be sent to the store display 148 near the shoe section highlighting brown shoes. The remote computing system 142 can also send a message to the customer's mobile computing device 146 informing the customer of a sale on brown shoes.

The NFC sensors 124 can be distributed to a number of locations in a store. Each location can be registered with a system such as the remote computing system 142. One or more products with smart tags 122 can be linked to each NFC sensor 124. As a customer manipulates a product with a smart tag 122 associated with a sensor, the NFC sensor 124 registers when the product moves in and out of proximity with the short range sensor. Typically, a product with a smart tag 122 will register as having left the proximity of the NFC sensor 124 when its signal is no longer readable by the sensor for a time of between 10 and 300 milliseconds.

The interactions between a mobile computing device 146, the Bluetooth transceivers 129, and the Wi-Fi transceivers 128 can be used to track the customer's location through the store. This information can be correlated with the locations of products with smart tags 122. In this way, the sensor data gathering environment 100 can tell when a customer approaches a product. When a sensor, such as an NFC sensor 124 registers that a product with smart tag 122 associated with that sensor has been moved out of proximity with the sensor, and a mobile computing device 146 is near the sensor, the remote computing system 142 can associate the product with smart tag 122 with the mobile computing device 146.

In another implementation, the mobile computing device 146 can include a Bluetooth-enabled scanner, wherein the scanner reads information from a Bluetooth smart tag 122, such as a tag built on the Nordic nRF51822 chipset. An application or web service can prompt a customer to confirm the product with which the customer is interacting.

Although not required, the sensor data gathering environment can be implemented via an application programming interface (API). For example, the mobile application 188 or customer behavior watching module 168 can use an API to interact with a remote computing system 142. The API, which is described in the general context of computer-executable instructions such as program modules, can communicate with program modules being executed by one or more computers, such as client workstations, servers, or other devices. Generally, program modules include routines, programs, objects, components, data structures and the like that perform particular tasks or implement particular abstract data types. Typically, the functionality of the program modules can be combined or distributed as desired in various implementations. Moreover, those skilled in the art will appreciate that the sensor data gathering environment can be practiced with other computer system configurations. Other well-known computing systems, environments, and/or configurations that can be suitable for use with the sensor data gathering environment include, but are not limited to, hand-held or laptop devices, programmable consumer electronics, and the like. The sensor data gathering environment 100 can also be implemented in distributed computing environments where tasks are performed by remote processing devices that are linked through a communications network or other data transmission medium. In a distributed computing environment, program modules and data can be located in both local and remote computer storage media including memory storage devices.

Customer behavior data can comprise a length of time the mobile computing device 146 is proximal to the smart tag 122. It can also include time and location in a store where the customer is not near a smart tag 122. A timestamp can be recorded by the mobile computing device 146 when the mobile computing device 146 associates with the smart tag, and when the mobile computing device 146 disassociates with the smart tag. A sensor within the mobile computing device 146 can obtain the customer's location data by taking a sequence of beacon readings transmitted by a Wi-Fi transceiver 128, a Bluetooth transceiver 129, or both, wherein each reading is processed by a signal strength indicator. The signal strength can correspond to the physical distance between the mobile computing device 146 and the transceivers. As the signal strength increases, the closer the mobile computing device 146 is to the transceiver broadcasting that signal, which can allow for trilateration. Triangulation can also be accomplished by calculating the angles between two or more transceivers and the mobile computing device 146. The location data can be transmitted to the remote computing system 142 for analysis, or the analysis can be done on the mobile computing device 146. Combining multiple methods of location identification for the mobile computing device 146 will improve the accuracy of the associations between the mobile computing device 146 and a smart tag 122. The association between the smart tag 122 and the mobile computing device 146 can be maintained as long as the stationary sensors find that the mobile computing device 146 is still within a defined distance from the smart tag 122.

The mobile computing device 146 can transmit the product information obtained from the smart tag 122 and the customer behavior information to a remote computing system 142 via a wireless network. In one implementation, the mobile computing device 146 can transmit additional information such as a customer ID, customer inquiries, requests for assistance, or the like. Customer identification and other information can be gathered from the customer's mobile computing device 146 or the customer information data store 112.

A customer may have to sign into an application or web service on a mobile device in order to use the mobile computing device 146 within the sensor data gathering environment 100. The remote computing system 142 receives, stores, and processes the information received from the customer information data store 112, the product information data store 114, the customer behavior engine 120, and the mobile computing device 146. In one implementation, the information transmitted to the remote computing system 142 can be stored in a SaleForce S1 platform.

Additionally, the remote computing system 142 can access other data sources to retrieve additional product information. In one implementation, the additional product information can include promotional items related to the product and related product manufacturing information. The product information, customer information, and any other information received or retrieved by the remote computing system can be stored in a database making analysis of the information more efficient and agile.

The product information 114, customer information 112 and any other information received or retrieved by the remote computing system 142 is analyzed to provide the customer with a personalized message or communication. In one implementation, the Exact Target Marketing Cloud (ETMC) can be used to manage the customer journey through the store and deliver optimized content to the customer. The selected message or communication to be received by the customer can be transmitted to a device integrated with the mobile computing device 146, or transmitted to a display unit 148 located in the store, near the location of the customer. In one implementation, the message based on the analyzed information is e-mailed, texted, streamed or the like to the customer's mobile computing device 146. In another implementation, a display 148 located near the product or the customer can interactively show different feature options of the product relevant to the customer, or provide a communication portal wherein the customer can converse in real time with a real or virtual sales representative.

Additionally, an alert or message can also be sent to an employee based on the analyzed information. The alert or message can prompt the employee to personally interact with the customer. The message or alert can include, but is not limited to, the analyzed data, the message delivered to the customer, customer behavior information, product information, promotional items, instructions on customer service procedures or the like.

A mobile computing device 146 processor, also known as a mobile processor can include one or more digital signal processors (DSP), microprocessor, microcontroller, central procession unit (CPU) or graphics processing unit (GPU), application specific integrated circuit (ASIC), reduced instruction set computing (RISC) or field-programmable gate array (FPGA) or a combination of these processor types. Mobile processors can control the overall operations of the mobile computing device 146. In addition to their operating system functions, they can execute software applications on the mobile computing device 146. The processors can interact with other components of the respective mobile computing device 146 such as radio frequency (RF) transceivers, device interfaces, memory units, etc. The communication related functions of the mobile computing device 146 are performed by RF transceivers integrated with the mobile computing device 146. The RF transceivers can transmit/receive RF signals through internal or external antennas.

For transmission, the RF transceivers can perform data channel-coding and spreading. In case of reception, they can convert received RF signals into baseband signals and perform de-spreading and channel decoding on the baseband signals to recover the original data. Additionally, RF transceivers can search for neighboring RF transceivers and perform a discovery or pairing process. The RF transceivers in conjunction with the processors can function as a signal measurement unit for determining the strength of a received signal or received signal strength indication (RSSI), implement a timer for determining the duration of a connection or broadcast, and place timestamps on the transferred signals for recording the date and time of transmission or reception. The input/output related functions of the mobile computing device 146 are executed by device interfaces. The device interfaces can comprise various input/output sub-systems such as a display, keyboard, microphone, speaker, serial port, etc.

In some implementations, the mobile computing device 146 can include one or more device interfaces for providing customers access to various system components and receiving information. The memory units such as Read Only Memory (ROM), Random Access Memory (RAM), flash memory and disk drive among others, can provide persistent or volatile storage. In some implementations, the memory units can store micro-codes of a program for processing and controlling device operations, temporary data generated during program executions, reserved data, and data transmitted and received by the mobile computing device 146. Short-range communication systems such as Near Field Communication (NFC) create and maintain connections between devices that are in close physical proximity to each other. Medium range communication systems such as Bluetooth, RFID, Z-Wave, ZigBee, Wi-Fi, etc. can establish peer-to-peer (P2P) connections between devices up to 100 meters apart. For example, a connection between a mobile computing device 146 and a Wi-Fi access point 203 can be created using medium range signals.

During Wi-Fi connection, mobile computing device 146 can operate in broadcast (connectionless) or connected modes. Broadcasting to a MAC address is supported by IPv4 and IEEE 802.11. In IPv6, multicasting takes the place of broadcasting. Tokens can be embedded in recognized broadcast message types. One example of a broadcast protocol is Internet Control Message Protocol, which is implemented in both IPv4 and IPv6. ICMP messages of various types could be used or a new type chosen from the reserved range of type codes. Another example of a broadcast protocol supported by IPv4 is the address resolution protocol (ARP). Query messages can be used to scan a WLAN (Wi-Fi) segment 203. From responses to a query, a list of unique media access control (MAC) addresses of connected devices can be compiled. In IPv6, the neighborhood discovery protocol (NDP) specifies a variety of multicast message types that could be adapted for transmitting information. When the mobile computing device 146 can broadcast ARP messages, the AP can forward the broadcasts to other connected devices. In some implementations, multiple APs covering a single location, such as a large store, can be relay broadcasts as a group or can be treated as a single AP. In some implementations, the system or customers can set a threshold or timeout limit to help the mobile computing devices aggregate physical connection events resulting from successive reception of the same customer identity token. In aggregated physical connection events resulting from reception of multiple customer identity tokens, customer identity tokens with higher counts, lengthier timestamps readings, or greater received signal strengths indications (RSSI) can indicate sustained and close proximity of two devices, including timestamp durations and RSSI values. The mobile computing device 146 can indicate the quality of a transmission.

In some implementations, the mobile computing device 146 can use Bluetooth technology, which can include an identification phase and a pairing phase. During the identification phase, the broadcasting device can set a frequency-hopping pattern, to which the mobile computing device 146 can synchronize its signals. In the pairing phase, the mobile computing device 146 can transmit low power short-range RF signals. In other implementations, the mobile computing device 146 can use NFC for ultrashort-range communication and replace the identification phase of the Bluetooth technology with a simple tap between the mobile computing device 146 and a NFC reader 206. In case of NFC, internal antennas within the mobile computing device 146 can function as windings of a transformer to generate high power ultra-short-range RF signals for broadcasting. In other implementations, the mobile computing device 146 can participate with wireless sensors 128 through Wi-Fi, via an Wi-Fi access point 203 that broadcasts a Wi-Fi signal usable over a medium-range area. In response to a MAC address based ARP scan initiated by mobile computing device 146, the AP 203 can generate a list of devices connected to it along with their 15 MAC address, names, format, Internet Protocol (IP), etc.

In many mobile computing devices, there is a convergence of technologies such as Bluetooth, Bluetooth Low Energy (BLE), Wi-Fi, RFID, and NFC. Bluetooth/BLE works in the 2.4 GHz range. Bluetooth standards of 4.0 and greater can work with beacon technologies. The standard Wi-Fi frequency is 2.4 GHz, and also 5 GHz with common definitions in the 802.11a/b/g/n/ac specifications. RFID uses the RF ranges such as 120-150 kHz, 13.56 MHz, 433 MHz, 865-868 MHz, and 902-928 MHz. In various ways, each of these technologies can be used for communications as well as tracking. Specially designed antennas can be utilized for each tracking technology to improve accuracy of the estimate of the distance between the customer and the product package.

These technologies are being used, individually and in unison, as real-time indoor location and tracking systems, as GPS does not function well indoors. Many companies, including Hewlett-Packard (HP) and Cisco have products using these technologies that perform position tracking of customers within retail settings. By combining the correlated location estimates of multiple real-time location systems with NFC (Near Field Communications) technology attached to a product package, an association can be made between the calculated location of a mobile computing device 146 and a product with smart tag 122.

Figure 2:
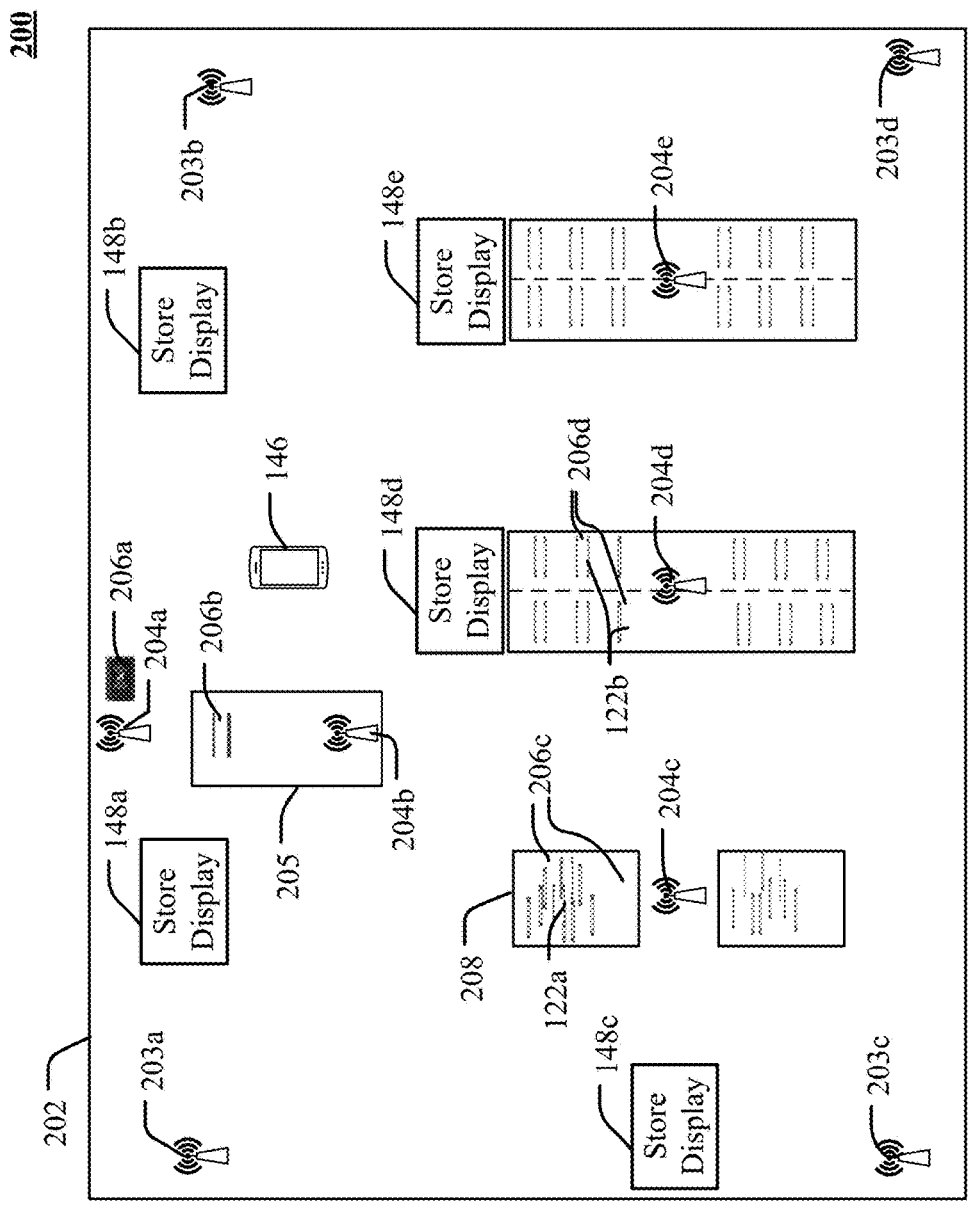
FIG. 2 illustrates one implementation of a store where sensor data gathering can occur.

FIG. 2 illustrates one implementation of a store where sensor data gathering can occur. FIG. 2 shows one implementation of a store 202 that contains a plurality of RF transceivers including Wi-Fi transceivers 203a-d, collectively known as 203, Bluetooth transceivers 204a-e, collectively known as 204, and NFC sensors 206a-d, collectively known as 206. The Wi-Fi transceivers 203 and Bluetooth transceivers 204 are used to track a customer's location in the store to within one meter of the customer's true location. The Bluetooth transceivers 204 can also track the movement of Bluetooth smart tags 122 within their range. The NFC sensors 206 are short range sensors installed in locations where a customer can register with the store, complete a transaction, interact with a product with smart tag 122, or other action that requires a touching or near touching gesture. For example, NFC sensor 206a can be used as a device that, when in proximity to a mobile computing device 146, the NFC sensor 206a can automatically configure the mobile computing device 146 for the Bluetooth transceiver 204 network, the Wi-Fi transceiver 203 network, or both, and can register the customer with the sensor data gathering environment 100. Variables such as the metal in shelves, the water content within the bodies of each customer within range, and the positional attitude of the mobile computing device 146 as held by the customer can all affect the accuracy of tracking estimates made by Wi-Fi 203 and Bluetooth 204 technologies. However, these estimates can be correlated, and trilateration of overlapping multiple sets of three Wi-Fi devices within 203a-d or three Bluetooth/BLE devices within 204a-e can be performed to improve accuracy to within the required granularity in most cases. The NFC sensors 206 can also be in proximity to products with smart tags 122 for association. For example, 206c indicates a plurality of NFC sensors under a bin filled with tagged products 122a that are within proximity of at least one of the NFC sensors 206c. Likewise, another implementation can have a shelf with multiple boxes, each box containing one product 122b, and the shelf having a NFC sensor 206d within proximity of each box 122b.

In one example, a customer already has a retailer application installed on his mobile computing device 146. The customer enters the store with the mobile computing device 146. In this example, the customer touches, or makes a touching motion to the mobile computing device 146 to a NFC sensor such as 206a, which configures the mobile computing device 146 for communications with Bluetooth transceivers 204 and the Wi-Fi transceivers 203 in that store. In another implementation the customer walks into the store but does not perform a proximity gesture with a NFC sensor 206. If properly configured either by the customer or by the retailer application, the mobile computing device 146 can have a subset of the connectivity provided by the proximity gesture.

The customer with mobile computing device 146 travels around store. His location in the store is estimated by the sensor data gathering environment 100. Events such as mobile computing device 146 associations with tagged products 122, general traffic, hotspots, and coldspots can be recorded.

In this example, when mobile computing device 146 is near table 208, the system registers that the mobile computing device 146 is near sweaters with NFC tags 122a. The sweaters on table 208 can be combined into a product group. If the mobile computing device 146 lingers, ads for sweaters matching customer's preferences can be shown on a store display 148c. If the customer touches, or makes a touching gesture with a sweater tag 122a with mobile computing device 146, it can cause the environment 100 to send information about the association with the sweater to mobile computing device 146 through the Bluetooth 204 or Wi-Fi 203 transceivers. The environment 100 knows that the customer spent 15 minutes walking around the sweater table 208, and this information is recorded.

If the mobile computing device 146 is then approaches the Bluetooth beacon 204d, the system will know that the customer is moving toward the shoe department, and can send relevant information to the store display 148d, and to mobile computing device 146. The remote computing system 142 can also associate the mobile computing device 146 with each of the shoe boxes that are proximal to the mobile computing device 146. NFC sensors 206d under products with smart tags 122b record each shoe box taken from the rack as the smart tags 122b leave proximity with their NFC sensor 206d. If the customer makes a touching gesture toward a smart tag on a shoebox, the remote computing system 142 can further validate the association of the product with mobile computing device 146. Information such as styles, colors, etc. that were of interest to the customer are recorded.

In this example, the customer then takes two sweaters with smart tags 122a and two pairs of shoes with smart tags 122b to the checkout counter. The customer's mobile computing device 146 is recognized by the Bluetooth transceiver 204b as it approaches the checkout counter 205. The customer can then touch each product with smart tag 122 to the NFC sensor 206b, and then touches the mobile computing device 146 to the NFC sensor 206b for electronic payment. A store employee could visually verify that each product was touched to the NFC sensor 206b, and that the smart tag matched the product.

When desired, such as with expensive items, multiple technologies such as both a NFC tag and a Bluetooth Low Energy tag can be placed on the item. In this case, once the customer has completed the purchase transaction and begins to leave the store, the Bluetooth transceiver 204a can record each item passing through the door, and verify that Bluetooth smart tag 122 was included in the purchase transaction authorized by the mobile computing device 146. The calculation of whether the item is leaving or entering the store can be estimated by the tracking methods within the sensor data gathering environment 100. Other combinations of tags will be obvious to someone skilled in the art.

FIG. 3 illustrates logic to associate a sensor with a smart tag. In this implementation, the sensor data gathering environment 100 tracks the customer with a mobile computing device 146 as she approaches a product 310 containing a smart tag 122. Once the customer is proximal to the smart tag, the sensor data gathering environment 100 associates 320 the mobile computing device 146 with the product with smart tag 122. At this point, the customer's mobile computing device 146 can receive additional product identification data 330 from the smart tag 122, and from the product information data store 114 via the remote computing system 142. A customer's mobile computing device 146 can be proximal to a plurality of products with smart tags 122. And a plurality of mobile computing devices 146 can be proximal to a product with smart tag 122. The association can include a timestamp and a flag identifying the beginning of an association. Once a mobile computing device 146 leaves the proximity of a smart tag 122 the mobile computing device 146 is disassociated from the smart tag 122, and logs the event with data including a timestamp and a flag identifying the end of the proximity. In one example, the total time of proximity between the mobile computing device 146 and the smart tag are calculated 340 as a way to derive a probability or level of interest in the product by the customer.

The product identification data and customer behavior data are analyzed 350 by the remote computing system 142. This analysis can include a measure of the number of times that the customer was registered as having been in proximity of a product or product group, and the total amount of time the customer spent proximal to the product or product group. In one example the customer can receive a personalized message 360 on their mobile computing device 146 if they visited the product or product group more than two times, or if they spent more than 5 minutes total in the proximity of the product or product group. The message can include promotional information, specific ads, or other customized communications. The mobile computing device 146 can also receive real-time communications through an API 370. Other implementations can have a different list of steps, and those steps can be in a different order. For example, in another implementation, a personal message may not be displayed 360. Rather, a store employee might be directed by the system to approach the customer to share product information directly with the customer. In yet another implementation, the customer can receive a personal message as well as being engaged by a store employee.

FIG. 4 illustrates one implementation of data structures for a sensor data gathering environment. This is a conceptual entity-relationship diagram, which is a summary of the logical and physical entity-relationship diagrams. In this example, each product 450 is associated with at least one smart ID tag 440, which links the product to inventory. In this example, each product has one smart ID tag containing one unique smart ID number. In other examples there can be multiple smart tags associated with a product. A product information table 455 contains general information for each product group such as name and description. One product group information record 455 with a name field of "Polo Shirt" could have many product records 450. The product 450 and smart tag 440 combinations can support multiple technologies with multiple tag descriptions 445.

A customer 430 has many entries in a customer profile 425 data structure. This structure can include customer information such as name, date of birth, addresses, and phone numbers. It can also include purchase history, products of interest, favorite products, inquiries made by the customer, and requests for assistance made by the customer.

A customer 430 can also have zero or more associations with products 450, and one or more behaviors 435 with each association. The behaviors can include the customer's 430 proximity to a product 450 over time. The consolidated customer data 430 is then made available to a customer behavior engine 120 that can be running on a remote computing system 142 or some other computing device.

The customer behavior engine 120 generates consolidated data from a messaging data structure 410 and a sales approach data structure 415 resulting in a plan for automated customer messaging as well as messaging for store employees who can participate in the selling process. The messaging data structure 410 contains reports of data analysis of the consolidated customer data 430. It also can contain lists of ads targeted toward the customer's demographic, lists of promotional items, personalized product suggestions, available message delivery methods, a history of messages already delivered to the customer, and instructions on potential sales approaches that are determined to be best suited for this customer. Sales approaches 415 can include cross selling methods, upselling, specific ads, and suggestions for customized communications with the customer. The automated customer message from communications 420 can be delivered to any combination of mobile computing device 146, a store display 148, through email or other social media 130, or other electronic communication method. The employee messaging from communications 420 can be used to assist an employee as they approach the customer to make a sale.

FIG. 5 is a block diagram of an example computer system 500, according to one implementation. The processor can be an ASIC or RISC processor. It can be an FPGA or other logic or gate array. It can include graphic processing unit (GPU)

resources. Computer system 510 typically includes at least one processor 572 that communicates with a number of peripheral devices via bus subsystem 550. These peripheral devices can include a storage subsystem 526 including, for example, memory devices and a file storage subsystem, customer interface input devices 538, customer interface output devices 578, and a network interface subsystem 576. The input and output devices allow customer interaction with computer system 510. Network interface subsystem 576 provides an interface to outside networks, including an interface to corresponding interface devices in other computer systems.

User interface input devices 538 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 510.

User interface output devices 578 can include a display subsystem, a printer, a fax machine, or non-visual displays such as audio output devices. The display subsystem can include a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 510 to the user or to another machine or computer system.

Storage subsystem 526 stores programming and data constructs that provide the functionality of some or all of the modules and methods described herein. These software modules are generally executed by processor 572 alone or in combination with other processors.

Memory 522 used in the storage subsystem can include a number of memories including a main random access memory (RAM) 534 for storage of instructions and data during program execution and a read only memory (ROM) 532 in which fixed instructions are stored. A file storage subsystem 536 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 536 in the storage subsystem 526, or in other machines accessible by the processor.

Bus subsystem 550 provides a mechanism for letting the various components and subsystems of computer system 510 communicate with each other as intended. Although bus subsystem 550 is shown schematically as a single bus, alternative implementations of the bus subsystem can use multiple busses. Computer system 510 can be of varying types including a workstation, server, computing cluster, blade server, server farm, or any other data processing system or computing device. Due to the ever-changing nature of computers and networks, the description of computer system 510 depicted in FIG. 5 is intended only as one example. Many other configurations of computer system 510 are possible having more or fewer components than the computer system depicted in FIG. 5.

One of ordinary skill in the art can appreciate that a computer or other customer device can be deployed as part of a computer network. In this regard, the technology disclosed pertains to any computer system having any number of memory or storage units, and any number of applications and processes occurring across any number of storage units or volumes. The technology disclosed can apply to an environment with server computers and client computers deployed in a network environment, having remote or local storage. The technology disclosed can also apply to a standalone computing device, having programming language functionality, interpretation and execution capabilities.

The technology disclosed can be implemented in the context of any computer-implemented system including a database system, a multi-tenant environment, or the like. Moreover, this technology can be implemented using two or more separate and distinct computer-implemented systems that cooperate and communicate with one another. The disclosed technology can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein.

As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. In addition, the term "specify" is used herein to mean the same as "identify."

While the technology disclosed is disclosed by reference to the preferred implementations and examples detailed above, it is to be understood that these examples are intended in an illustrative rather than in a limiting sense. It is contemplated that modifications and combinations will readily occur to those skilled in the art, which modifications and combinations will be within the spirit of the technology disclosed and the scope of the following claims Some Particular Implementations In one implementation, the system can sense user manipulation of a product package by a user by having at least one short range sensor that interacts with a tag on the product package and implements a recognition time of 10 to 300 ms between a connected and disconnected state of coupling with the tag, wherein the short range is under 20 cm. It also has at least one wireless sensor that interacts with a device carried by the user, identifies the user, and generates data from which a position of the device carried by the user is estimated. A correlation processor coupled in communication with the short range sensor and the wireless sensor then implements a correlation between recognition of a product package transition to the disconnected state and estimation of the user position to be within 1 meter of the manipulated product package at a time of the transition to the disconnected state. It also reports at least the correlation of the manipulated product with the device carried by the user to a further process.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations in other sections of this document.

The system further includes the short range sensor using standard-compliant near field communications (NFC) to interact with the tag on the product package. It also includes the short range sensor using standard-compliant near field communications (NFC) to interact with the tag on the product package and to sense a transition between the connected and disconnected state of the coupling within 10 to 300 ms of a user removing the product package from a display. And it can further process selecting a message based on the correlation of the manipulated product with the user identity; and transmit the selected message to the device carried by the user.

The system can also include the wireless sensor receiving from the device a signal indicating user identification to the device of the product package, the wireless sensor receiving from the device a signal indicating use of to the device to optically capture at least part of the product package, and the wireless sensor receiving from the device a signal indicating use of the device to wand the tag on the product package.

In one implementation, the system can further include a display that projects messages to users regarding products, selecting a message for the user based on the correlation of the manipulated product with the user identity; and transmitting the selected message to the display.

The system also includes a plurality of RF transmitters operating between 30 kHz and 300 GHz with measurable signal strength and having known positions, coupled in a communication with the device, and a position processor coupled to the wireless sensor that processes the signal strength data measured by or from the device and estimates a position of the device using at least the measured signal strength data.

The system further includes a plurality of RF transmitters operating between 30 kHz and 300 GHz with measurable received signal strength and having known positions, coupled in communication with the device, wherein the wireless sensor receives from the device at least one estimated position of the device based on using at least measured signal strength data from the plurality of RF transmitters, and wherein the wireless sensor receives from the device at least one estimated position of the device.

In another implementation, the system also includes a plurality of RF transmitters or emanators located among shelves holding product packages, wherein the RF transmitters or emanators are detectable by the device carried by the user and signal proximity of the device to shelf locations can be calculated. The wireless sensor receives from the device at least some reports of proximity to the shelf locations.

The system further includes a plurality of RF transmitters or emanators located among shelves holding product packages, wherein the RF transmitters or emanators are detectable by the device carried by the user and signal proximity of the device to product packages, wherein the wireless sensor receives from the device at least some reports of proximity to the product packages. It also includes a wireless sensor that senses arrival of device carried by the user when the user enters a store, and a wireless sensor that tracks movement of the device carried by the user through a store as the user interacts with product packages.

This system and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations impacting details of test design and implementation.

This also includes a method for sensing user manipulation of a product package by a user, the method including sensing, using at least one short range sensor that interacts with a tag on the product package, transition between a connected and disconnected state of coupling with the tag, wherein the transition sensing has a recognition time of 10 to 300 ms and wherein the short range is under 20 cm, receiving at a wireless sensor, from a device carried by the user, location-related data and user identity data, and forwarding the location-related and user identity data to a correlation processor, correlating, at the correlation processor coupled in communication with the short range sensor and the wireless sensor, recognition of a product package transition to the disconnected state and estimation of a user position to be within 1 meter of the manipulated product package at a time of the transition to the disconnected state; and reporting of at least the correlation of the manipulated product with the user identity to a further process.

The method further includes the short range sensor using standard-compliant near field communications (NFC) to interact with the tag on the product package, and the short range sensor using standard-compliant near field communications (NFC) to interact with the tag on the product package and to sense the transition between the connected and disconnected state of the coupling within 10 to 300 ms of a user removing the product package from a display. It also includes a process to select a message based on the correlation of the manipulated product with the user identity; and a process to transmit the selected message to the device carried by the user.

The method also includes a process for selecting a message for the user based on the correlation of the manipulated product with the user identity; and the further process of transmitting the selected message to a stationary display in the store. The wireless sensor also receives from the device at least one estimated position of the device.

These methods and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations impacting details of test design and implementation.

There is also a tangible computer readable medium holding computer program instructions that, when executed, implement sensing user manipulation of a product package by a user, the tangible computer readable medium implementing actions including; sensing, using at least one short range sensor that interacts with a tag on the product package, transition between a connected and disconnected state of coupling with the tag, wherein the transition sensing has a recognition time of 10 to 300 ms and wherein the short range is under 20 cm; recognizing at a wireless sensor location-related data and user identity data, received from a device carried by the user, and forwarding the location-related and user identity data to a correlation processor; correlating, at the correlation processor coupled in communication with the short range sensor and the wireless sensor, recognition of a product package transition to the disconnected state and estimation of a user position to be within 1 meter of the manipulated product package at a time of the transition to the disconnected state; and reporting of at least the correlation of the manipulated product with the user identity to a further process.

This tangible computer readable medium further includes the further process selecting a message based on the correlation of the manipulated product with the user identity; and the further process transmitting the selected message to the device carried by the user. It also includes the further process selecting a message for the user based on the correlation of the manipulated product with the user identity; the further process transmitting the selected message to a stationary display in the store; and wherein the wireless sensor receives from the device at least one estimated position of the device.

While the present technology is disclosed by reference to the preferred implementations and examples detailed above, it is to be understood that these examples are intended in an illustrative rather than in a limiting sense. It is contemplated that modifications and combinations will readily occur to those skilled in the art, which modifications and combinations will be within the spirit of the technology and the scope of the following claims.

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

What is claimed is:

1. A system for sensing user interest in a product from actions made by a user, the system including:
   at least one short range sensor that interacts with a tag, co-located with the product and implements a connected state and a disconnected state of coupling with the tag,
   at least one wireless sensor that interacts with a device carried by the user and generates data from which a position of the device carried by the user is estimated;
   a correlation processor coupled in communication with the short range sensor and the wireless sensor, that implements:
      a correlation between recognition of a transition to the disconnected state by the short range sensor and the position of the device carried by the user to be near the product at a time of the transition to the disconnected state; and
      reporting of at least the correlation of the transition to the disconnected state with the position of the device carried by the user to a further process.

2. The system of claim 1, further including:
   the short range sensor using standard-compliant near field communications (NFC) to interact with the tag, wherein range of the short range sensor is under 20 cm.

3. The system of claim 1, further including:
   the short range sensor using standard-compliant near field communications (NFC) to interact with the tag and to sense a transition between the connected state and disconnected state of the coupling within 10 to 300 ms of coupling with the tag.

4. The system of claim 1, further including:
   the wireless sensor identifying a user identity for the user based upon interaction with the device;
   the further process selecting a message based on correlation of the product with the user identity; and
   the further process transmitting the message selected to the device carried by the user.

5. The system of claim 1, further including:
   the wireless sensor receiving from the device a signal indicating user identification to the device of the product.

6. The system of claim 1, further including:
   the wireless sensor receiving from the device a signal indicating use of the device to optically capture at least part of the product.

7. The system of claim 1, further including:
   wherein the transition to the disconnected state and the position of the device carried by the user to be within 1 meter of the product at a time of the transition to the disconnected state and
   the wireless sensor receiving from the device a signal indicating use of the device to wand the tag.

8. The system of claim 1, further including:
   a display that projects messages to users regarding products;
   the wireless sensor identifying a user identity for the user based upon interaction with the device;
   the further process selecting a message for the user based on the correlation of the product with the user identity; and
   the further process transmitting the message selected to the display.

9. The system of claim 1, further including:
   a plurality of RF transmitters operating between 30 kHz and 300 GHz with measurable signal strength and having known positions, coupled in communication with the device; and
   a position processor coupled to the wireless sensor that processes signal strength data measured from the device and estimates a position of the device using at least the measured signal strength data.

10. The system of claim 1, further including:
    a plurality of RF transmitters operating between 30 kHz and 300 GHz with measurable received signal strength and having known positions, coupled in communication with the device;
    wherein the wireless sensor receives from the device, at least one estimated position of the device based on using at least measured signal strength data from the plurality of RF transmitters.

11. The system of claim 1, wherein the wireless sensor receives from the device, at least one estimated position of the device.

12. The system of claim 1, further including:
    a plurality of RF transmitters or emanators, located among products, wherein the RF transmitters or emanators are detectable by the device carried by the user and signal proximity of the device to products;
    wherein the wireless sensor receives from the device, at least some reports of proximity to products.

13. The system of claim 1, further including:
    a plurality of RF transmitters or emanators, located among some displayed products, wherein the RF transmitters or emanators are detectable by the device carried by the user and signal proximity of the device to displayed products;
    wherein the wireless sensor receives from the device, at least some reports of proximity to displayed products.

14. The system of claim 1, wherein the wireless sensor senses arrival of the device carried by the user when the user enters an area containing products.

15. The system of claim 1, wherein the wireless sensor tracks movement of the device carried by the user through an area as the user interacts with products.

16. A method for sensing user interest in a product from actions made by a user, the method including:
sensing, using at least one short range sensor that interacts with a tag, co-located with the product, a transition between a connected state and a disconnected state of coupling with the tag;
receiving at a wireless sensor, from a device carried by the user, location-related data and forwarding the location-related data to a correlation processor;
correlating, at the correlation processor coupled in communication with the short range sensor and the wireless sensor, recognition of a transition to the disconnected state by the short range sensor and an estimation of a user position relative to the product at a time of the transition to the disconnected state; and
reporting of at least the correlation of the transition to the disconnected state with the estimation of the user position to a further process.

17. The method of claim 16, further including:
the short range sensor using standard-compliant near field communications (NFC) to interact with the tag, wherein range of the short range sensor is under 20 cm.

18. The method of claim 16, further including:
the short range sensor using standard-compliant near field communications (NFC) to interact with the tag and to sense the transition between the connected state and disconnected state of the coupling within a recognition time of 10 to 300 ms of coupling with the tag.

19. The method of claim 16, further including:
the wireless sensor identifying a user identity for the user based upon interaction with the device;
the further process selecting a message based on correlation of the product with the user identity; and
the further process transmitting the message selected to the device carried by the user.

20. The method of claim 16, further including:
the wireless sensor identifying a user identity for the user based upon interaction with the device;
the further process selecting a message for the user based on correlation of the product with the user identity; and
the further process transmitting the message selected to a display in a store.

21. The method of claim 16, wherein the wireless sensor receives from the device, at least one estimated position of the device.

22. A non-transitory computer readable medium holding computer program instructions that, when executed, implement sensing user interest in a product from actions made by a user, the non-transitory computer readable medium implementing actions including:
sensing, using at least one short range sensor that interacts with a tag, co-located with the product, a transition between a connected state and a disconnected state of coupling with the tag;
recognizing at a wireless sensor, location-related data received from a device carried by the user, and forwarding the location-related data to a correlation processor;
correlating, at the correlation processor coupled in communication with the short range sensor and the wireless sensor, recognition of a transition to the disconnected state by the short range sensor and an estimation of a user position at a time of the transition to the disconnected state; and
reporting of at least the correlation of the transition to the disconnected state with the estimation of the user position to a further process.

23. The non-transitory computer readable medium of claim 22, further including:
the short range sensor using standard-compliant near field communications (NFC) to interact with the tag and to sense a transition between the connected state and disconnected state of the coupling within 10 to 300 ms of coupling with the tag, wherein range of the short range sensor is under 20 cm.

24. The non-transitory computer readable medium of claim 22, further including:
the wireless sensor identifying a user identity for the user based upon interaction with the device;
the further process selecting a message based on correlation of the product with the user identity; and
the further process transmitting the message selected to the device carried by the user.

25. The non-transitory computer readable medium of claim 22, further including:
the wireless sensor identifying a user identity for the user based upon interaction with the device;
the further process selecting a message for the user based on correlation of the product with the user identity; and
the further process transmitting the message selected to a display in a store.

26. The non-transitory computer readable medium of claim 22, wherein the wireless sensor receives from the device, at least one estimated position of the device.

* * * * *